(12) United States Patent
Requate et al.

(10) Patent No.: US 7,261,817 B2
(45) Date of Patent: Aug. 28, 2007

(54) FILTER MODULE AND DEVICE FOR STATIC FILTRATION OF FLUIDS WITH SUCH A MODULE

(75) Inventors: Willi Requate, Heiligenstadt (DE); Ulrich Grummert, Bad Soden Allendorf (DE); Holger Linne, Göttingen (DE); Pachalis Nikoloudis, Göttingen (DE); Ralf Lausch, Göttingen (DE); Oscar-Werner Reif, Hanover (DE)

(73) Assignee: Sartorius Biotech GmbH, Goettingen (DE)

( * ) Notice: Subject to any disclaimer, the term of this patent is extended or adjusted under 35 U.S.C. 154(b) by 480 days.

(21) Appl. No.: 10/884,436

(22) Filed: Jul. 2, 2004

(65) Prior Publication Data
US 2005/0035044 A1  Feb. 17, 2005

(30) Foreign Application Priority Data
Aug. 13, 2003 (DE) .............................. 103 37 215

(51) Int. Cl.
*B01D 24/02* (2006.01)
*B01D 24/08* (2006.01)
*B01D 24/18* (2006.01)
*B01D 24/40* (2006.01)

(52) U.S. Cl. .................. 210/283; 210/284; 210/343
(58) Field of Classification Search ................ 210/283, 210/284, 343
See application file for complete search history.

(56) References Cited

U.S. PATENT DOCUMENTS 6,464,084 B2   10/2002   Pulek ........................ 210/486
6,827,851 B1 *  12/2004  Strohm et al. .............. 210/228
2005/0061729 A1 *  3/2005  Strohm et al. .............. 210/284

FOREIGN PATENT DOCUMENTS

| DE | 38 16 434 A1 | 11/1988 |
|---|---|---|
| EP | 1 104 331 B1 | 5/2003 |
| EP | 1 112 114 B1 | 5/2003 |
| FR | 390755 * | 10/1908 |
| WO | WO 01/83077 A1 | 11/2001 |
| WO | WO 03/086576 A1 * | 10/2003 |

* cited by examiner

*Primary Examiner*—Thomas M. Lithgow
(74) *Attorney, Agent, or Firm*—Anthony J. Casella; Gerald E. Hespos

(57) ABSTRACT

The invention relates to a filter module and an apparatus for the static filtration of liquids using filter cells having deep bed filter layers and using spacer layers. According to the invention the filter module has a stack of n filter cells and n+1 spacer layers for filtrate and at least one channel arranged in the interior of the filter module. In this case n is ≧1. The filter cells consist of a draining spacer layer for feed liquid and deep bed filter layers which are arranged in a sandwichlike manner thereto and which are joined to one another at their circumference toward the at least one channel at the rim via a sealing compound and wherein the spacer layers for filtrate are furnished with the sealing compound at the rim on their external circumference. The invention can be used to remove substances from liquids, in particular for clarification and sterile filtration in the sectors of the foods industry, drinks industry, pharmaceuticals and chemicals industry, and also in the field of environmental engineering.

23 Claims, 3 Drawing Sheets

FILTER MODULE AND DEVICE FOR STATIC FILTRATION OF FLUIDS WITH SUCH A MODULE

The invention relates to a filter module and an apparatus for the static filtration of liquids using filter cells containing deep bed filter layers and spacer layers.

The subject matter of the invention is usable for removing substances from liquids by static filtration, in particular for clarification and sterile filtration in the sectors of the food industry, drinks industry, pharmaceuticals and chemicals industry, and also in the field of environmental engineering. The substances are preferably removed using a filter module and an apparatus with which a multiplicity of static filtrations running in parallel can be carried out.

Deep bed filter layers are taken to mean layers which are made up of fibrous filter materials and, if appropriate, can contain additives.

Filter modules and apparatuses for the static filtration of liquids using flat sections of spacer layers and deep bed filter layers arranged in between are known.

EP 1 104 331 B1 describes a filter module having layers of deep bed filter layers made of fibrous filter material between which are arranged spacer elements of draining layers. The draining layers and the deep bed filter layers are stacked one above the other without a gap and the draining layers are alternately sealed off from the filtrate/unfiltered material side by means of sealing elements. The draining layers, at the transition to the unfiltered material/filtrate space, have flow elements, and the sealing elements and the flow elements have means for mutual connection. It is a disadvantage that the deep bed filter layers must also be corresponding sealing elements facing the filtrate space, which makes the filter modules expensive. The fact that the flow elements impede inlet and outlet of feed liquid and filtrate, and lead to pressure losses, is a further disadvantage, as is the complicated construction of the sealing elements and flow elements together with the means, such as projections, rings, lugs or the like for the mutual connection. Such means can lead to damage of the filter layers and thus to impermissible breakthroughs of unfiltered feed liquid, in particular if, in addition to the deep bed filter layers, sensitive filter layers are used.

EP 1 112 114 B1 describes a filter module having collector/distributor layers for filtrate and unfiltered material, between which at least one filter layer composed of deep bed filter material is in each case arranged. The filter layers and the collector/distributor layers are layered one on top of the other without a gap and they are to be made of the same base material, have different permeability and/or degrees of separation and be sealed off alternately to the filtrate/unfiltered material space by means of the sealing elements. The sealing elements are made of the filter layer having the highest degree of separation or from a resin-impregnated filter layer, or they are to be molded parts that have means for mutual connection. It is disadvantageous that valuable filter layers are used to fabricate the sealing elements, as a result of which filter area is lost, or that additional shaped pieces are used as sealing elements, which, in addition, must have further means for mutual connection, which leads to an expensive fabrication of the filter modules.

WO 01/83077 A1 describes a filter module having layers of deep bed filter layers between support layers, a first seal being present between the deep bed filter layers and the support layers adjacent to the outlet for filtrate and a second seal being present between the deep bed filter layers and the support layers adjacent to the inlet for feed liquid. The seal is produced by a knife seal which is mounted on the support layers and pressed into the adjacent deep bed filter layer. It is disadvantageous that the filter material can be destroyed by incorrect pressing of the knife, the dead volume of the module is increased and the support layers containing the knife seals must be fabricated in an expensive manner.

DE-A 38 16 434 discloses a filter module consisting of flat sheet filter elements which are sealed at the rim and have draining support elements, and an apparatus made therefrom. The sheet filter elements are formed by a plurality of strip-shaped congruent and stacked sections, the rims of which are held in pairs, with a spacing for drainage, at two opposite sides of the stack, by sealing elements in the form of a plastic composition applied in the liquid state and cured, to form pockets which are open in each case to one rim side, and the end surfaces of the stack are sealed overall by a plastic compound. The pockets which are open to the one side are to be assigned to a first fluid space, and the pockets which are open to the other side are to be assigned to another fluid space of a housing. It is disadvantageous that, after manufacture, the module cannot be changed and adapted to the respective filtration task, and also the restriction to a strip-shaped geometry, as a result of which such modules cannot be employed in a space-utilizing manner in a commercially conventional housing. Furthermore, as a result of the arrangement of the plastic sealing compound, a relatively high amount of valuable filter surface is lost to the filtration process.

Numerous filter modules having deep bed filter layers are also known which are combined to form filter cells with a spacing for drainage, which cells are held by a seal in their outer peripheral rim area. They are permeable to a fluid channel in the central region. Generally, flow passes though the deep bed filter layers of the filter cells from the exterior to the interior during the filtration of the feed liquid to be filtered. For instance, U.S. Pat. No. 6,464,084 B2 describes such a filter cell formed in a biconvex lens shape having a plastic seal in the outer circumferential region. It is disadvantageous that owing to the seal in the outer circumferential region, a relatively high amount of effective filter surface is lost to the filtration and the complicated construction in the interior of such cells, in particular in the central region, to remove filtrate and to seal adjacent filter cells requires additional construction elements, for example, sealing rings.

The object underlying the invention is therefore to provide a compact filter module and an apparatus for the static filtration of liquids using deep bed filter layers, which module and apparatus consist of simple and few components and also ensure high filtration reliability.

The subject inventive filter module consists of two end caps which are connected to one another via connection means and, arranged pressed in between said end caps, a stack of n filter cells and n+1 draining spacer layers for filtrate which are congruent to the filter cells, and at least one channel arranged in the interior of the filter module, which channel is formed by corresponding openings in the filter cells and spacer layers and an opening in at least one of the end caps. The number n is to be equal to 1 or greater than 1. The filter cells consist of a draining spacer layer for feed liquid and deep bed filter layers which are arranged in a sandwichlike manner thereto and which are joined to one another in a leakproof manner at their circumference toward the at least one channel at the rim via a liquid impermeable sealing compound and the spacers for filtrate being likewise furnished with the sealing compound at the rim at their outer circumference.

By means of the invention a compact and variable construction of filter modules can be implemented in a simple manner in which the number of filter cells having the required properties of the deep bed filter layers is selected for the filtration task to be achieved. By means of the fact that the filter cells are joined to one another in a leakproof manner, not in the peripheral outer circumferential region, but at their circumference toward the at least one channel, at the rim via a liquid-impermeable sealing compound, a significantly higher filter area is available for filtration than in the filter cells of the prior art, more precisely generally at least 10%. For example, inventive filter modules having circular filter modules of 70 mm in diameter and having a circular central channel of 18 mm in diameter for a width of sealing compound of 3 mm have more than 15% more filter area than correspondingly dimensioned modules having sealing compounds at the outer circumference.

The spacer layers for filtrate have, at the rim, liquid-impermeable sealing compound which is present at the outer circumference. In a preferred embodiment of the invention, the sealing compound extends in the planes of the spacer layers and over a width which corresponds to at least the height of the adjacent deep bed filter layer. This is because this ensures that the feed liquid to be filtered has to cover at least a path through the deep bed filter layer over the entire area of the deep bed filter layer which path corresponds to the thickness of the deep bed filter layer in the finished filter module and no short circuits can occur in the region of the edges of the outer periphery, which would lead to a breakthrough of the substances to be separated. At the prevailing pressure difference between the outer space around the filter module for feed liquid (unfiltered material space) and the filtrate space for filtrate, the feed liquid predominantly penetrates into the open draining spacer layer, passes through the deep bed filter layers and is passed via the draining spacer layer for filtrate into the filtrate space and is passed out of the housing of the filter apparatus via the outlet for filtrate. Flow therefore passes through the filter cells from the interior to the exterior.

For the construction of an inventive filter module, only two types of preassembled main components are thus required, filter cells and spacer layers for filtrate, the latter being equipped with a seal at the outer circumference. By means of the fact that the sealing compounds are in the plane of the spacer layers, damage to the adjacent deep bed filter layers or other filter layers, for example membrane filter layers, is excluded. The sealing compounds cause no significant dead volume.

Preferably, the sealing compounds have the same height as the spacer layers. However, the sealing compounds can also be higher than the spacer layer in the planes of the spacer layers, preferably at least 10 µm. This is expedient, in particular, when the deep bed filter layers have rough surfaces or when feed liquids with high particle contents are to be filtered.

The sealing compounds consist of a permanently elastic material. Before the filter module is assembled, they are introduced separately into the spacer layers and filter cells in liquid form in a manner known to those skilled in the art, and cured. Preferably, the permanently elastic material consists of a silicone plastic or a polyurethane plastic.

The spacer layers consist of woven fabrics, knitted fabrics, meshes or nonwoven webs formed by fibers or wires. The fibers and wires preferably consist of polymer materials. Frequently, in particular when particle-containing feed liquids are filtered, it can be expedient to use, on the influent side for the feed liquid, spacer layers consisting of relatively coarse fibers or wires and having greater spacing between the fibers or wires than on the outflow side for filtrate.

The deep bed filter layers consist of fibrous deep bed filter material. Preferably those used have differing degrees of separation. In a preferred embodiment of the invention, a plurality of deep bed filter layers having identical or different degrees of separation are stacked one upon the other in series to form step filters. The deep bed filter layers can consist of fibers which have chromatographic properties toward certain substances. The fibers can be chemically modified. The deep bed filter layers, in an alternative embodiment, can also contain separate particles, for example activated carbon particles, which themselves have chromatographic properties toward certain substances in the feed liquid. Chromatographic properties are taken to mean interaction with certain substances. The interactions can be caused by adsorptions, chemical bonds or electrostatic forces.

In a further embodiment of the invention, the deep bed filter layers have a separation gradient. The separation gradient is caused by fiber diameters and/or packing densities of the fibers changing with the thickness of the deep bed filter layer.

In a preferred embodiment of the invention, the filter layers consist of a composite of a deep bed filter layer and a filter membrane layer. For this, the filter membrane layer is joined, at least at the outer circumference of the deep bed filter layer, to the deep bed filter layer in a fluid-tight manner at the rim. The joint between filter membrane and deep bed filter layer can be produced by sealing the membrane with temperature and pressure. The use of filter layers as a composite between deep bed filter layer and filter membrane layer is only possible by the inventive use of the sealing compound which has no projections, rings, lugs, beads and the like, which ensures that the sensitive filter membrane layer is not destroyed under the compression force in the filter module. The filter membrane layer in the composite firstly increases the reliability of filtration and secondly permits a broader spectrum in the separation of substances. For instance, filter membrane layers in the microfiltration area can be used, the pore diameter of which permits reliable retention of microorganisms, such as bacteria, or certain substances, for example proteins, can be retained by using filter membrane layers in the ultrafiltration range, or materials of value or toxins can be retained in a targeted manner, by filter membrane layers which act specifically and are made of membrane absorbers being used in the composite.

The end caps having the stack of filter cells and spacer layers for filtrate arranged between them are connected to the filter module by connection means. In a preferred embodiment of the invention, a liquid-permeable tube passes through the at least one channel in the filter module. According to the invention, the connection means can have at least one connecting rod for connecting the end caps. These connecting rods are connected to the end caps, for example, at the outer circumference. Preferably, the end caps for this are constructed to be larger than the filter cells.

In a further preferred embodiment of the invention, the filter cells are constructed so as to be planar. This has the advantage of a greater mechanical stability within the stack in the module and lower dead volume, compared with the filter cells constructed in a biconvex lens shape.

The object of the invention is further achieved by an apparatus for the static filtration of liquids, consisting of a housing having at least one inlet for feed liquid to be filtered and at least one outlet for filtrate and at least one filter module arranged in between as described above, the at least one channel of the filter module being connected to at least one outlet for filtrate of the housing. The filter module consists of two end caps which are connected to one another via connection means and, arranged pressed in between said end caps, of a stack of n filter cells and n+1 draining spacers for filtrate which are congruent to the filter cells and having at least one channel arranged in the interior of the filter module, which channel is formed by corresponding openings in the filter cells and spacers and at least one opening of the end caps. In this case, n is ≧1. The filter cells consist of a draining spacer layer for feed liquid and deep bed filter layers which are arranged in a sandwichlike manner thereto and which are joined to one another in a leakproof manner at their circumference toward the at least one channel at the rim via a liquid-impermeable sealing compound, and the spacers for filtrate being furnished with the sealing compound at the rim at their outer circumference.

The invention is now to be described with reference to FIGS. 1 to 3, in which.

Figure 1:
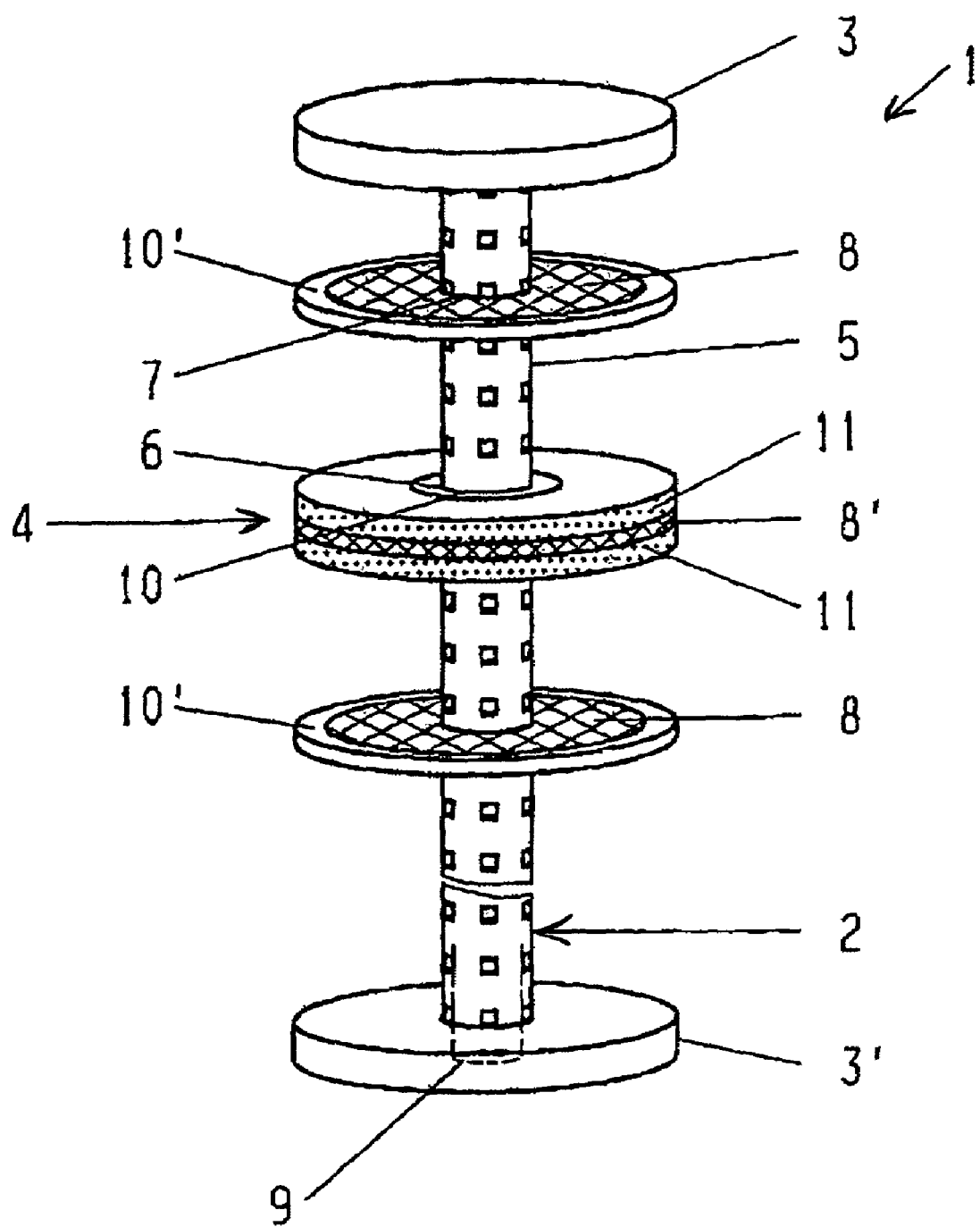
FIG. 1 shows the subject inventive filter module, in part, in exploded view.

According to FIG. 1, in the inventive filter module 1 for static filtration of liquids, the two end caps 3, 3' are connected to one another via a connection means 2. The connection means 2, in the embodiment shown, consists of a liquid-permeable tube 20 which at its ends is, for example, welded to the end caps. Between the end caps 3, 3' a stack of filter cells 4 and draining spacer layers for filtrate 8 which are congruent to the filter cells is arranged in pressed relationship. In the interior of the filter module 1 a channel 5 is constructed which is formed via corresponding openings 6, 7 and 9 in the filter cells 4, the spacers 8, and in one end cap 3'. The filter cells 4 consist of a draining spacer layer for feed liquid 8' and deep bed filter layers 11 which are arranged in a sandwichlike manner thereto and which are joined to one another in a leakproof manner with respect to the channel 5 at their circumference toward the at least one channel 5 at the rim via a liquid-impermeable sealing compound 10. The spacer layers for the filtrate 8 are furnished with the sealing compound 10' at the rim at their outer circumference.

Figure 2:
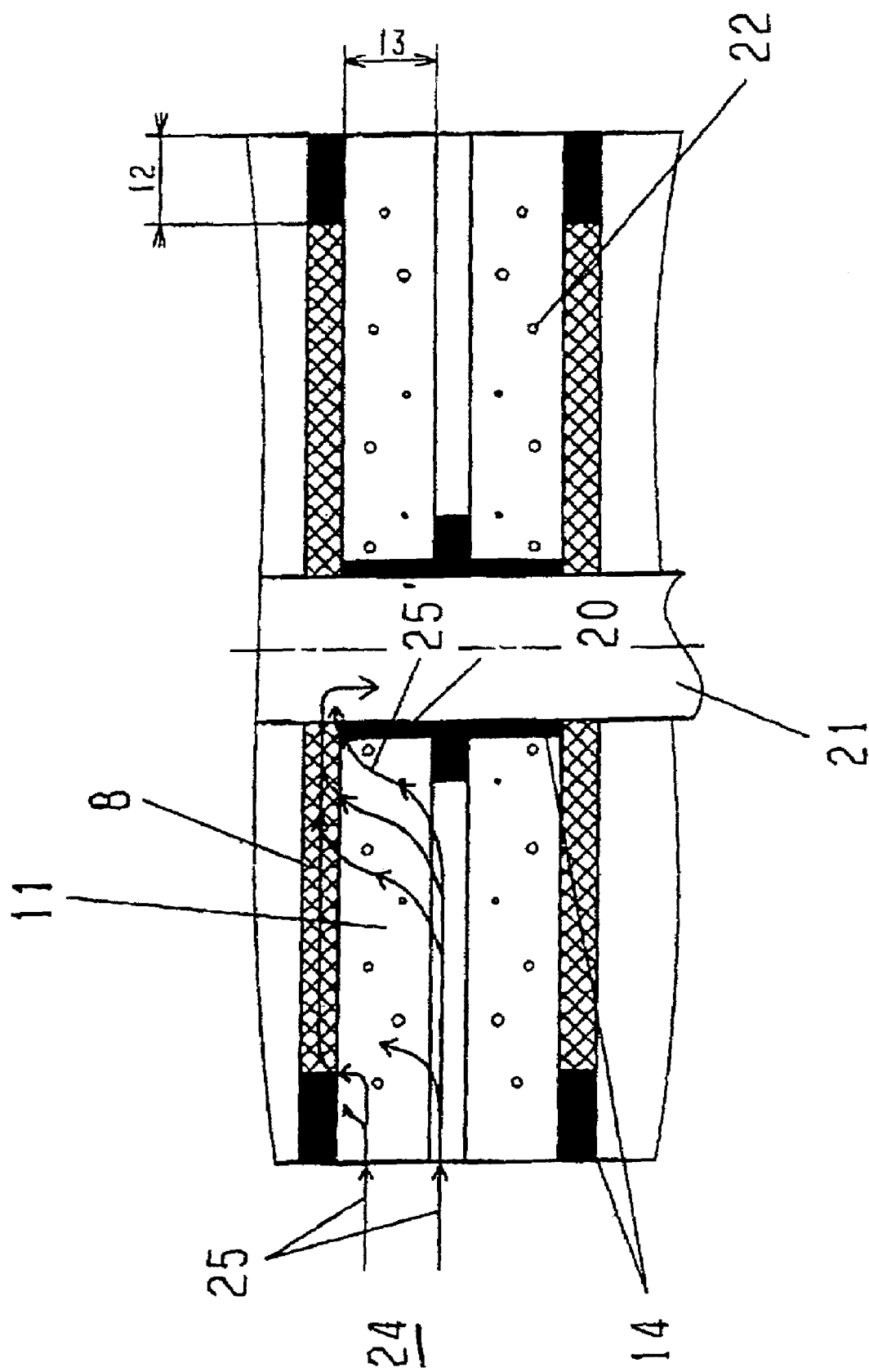
FIG. 2 shows diagrammatically a longitudinal section through a filter module having a filter cell.

As shown in FIG. 2, the sealing compounds 10' extend in the planes of the spacer layers 8 and over a width 12 which corresponds to the height 13 of the adjacent filter layer 11. In the embodiment of the invention shown in FIGS. 1 to 3, the height 13 of the sealing compound 10, 10' is identical to the height of the filter cells 4 and of the spacer layer 8. The sealing compounds 10, 10' consist of a permanently elastic material 14 which is preferably a silicone plastic.

The spacer layers 8 consist of woven fabrics, knitted fabrics, meshes or nonwoven webs formed from fibers or wires. The deep bed filter layers 11 consist of fibrous deep bed filter material which can also have chromatographic properties. Alternatively, as shown in FIG. 2, separate particles 22 having chromatographic properties are accommodated in the deep bed filter layers 11.

Figure 3:
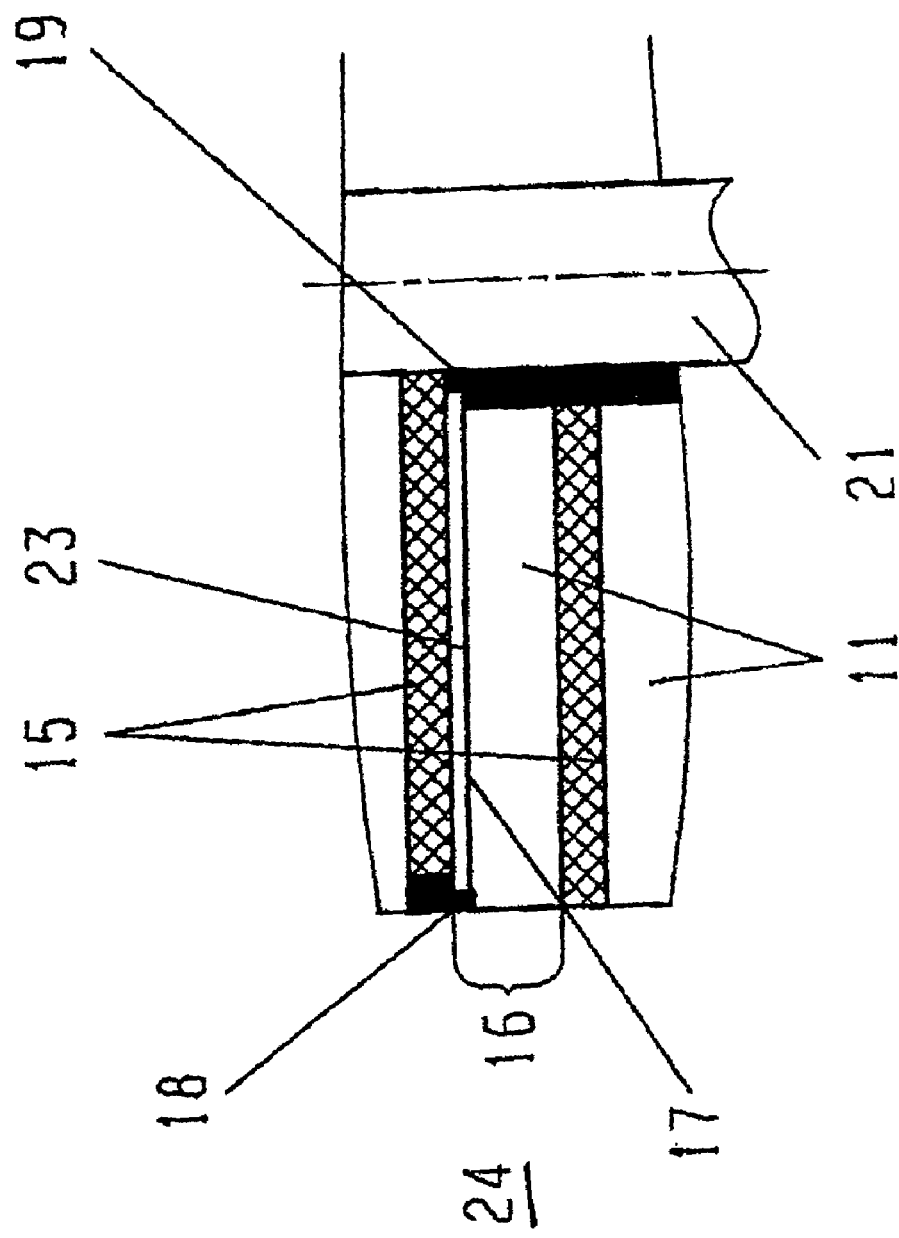
FIG. 3 shows diagrammatically a longitudinal section through a filter module having deep bed filter layers in combination with filter membrane layers.

FIG. 3 shows one embodiment of the invention in which the deep bed filter layers 11 are constructed as a composite 16 together with a filter membrane layer 23. The filter membrane layers 23 are connected, on the circumferential plane 17 of the deep bed filter layers 11 at the rim 18, 19 in a fluid-tight manner to the deep bed filter layers 11, which plane is adjacent to the filtrate space 21 and the unfiltered material space 24. The connection between deep bed filter layer 11 and filter membrane layer 23 is preferably a seal connection 18, 19.

To carry out the static filtration using an apparatus which is not shown, the inventive filter module 1 is installed in a housing having at least one inlet for feed liquid to be filtered and having at least one outlet for filtrate. As indicated by the flow arrows 25, 25' in FIG. 2, at the prevailing pressure difference between external unfiltered material space 24 of the feed liquid and the filtrate space 21, the feed liquid predominantly penetrates into the draining spacer layers 8', passes through the deep bed filter layers 11 and is passed via the draining spacer layers 8 into the filtrate space 21 and is passed out of the housing of the apparatus via the outlet for filtrate. In order that, in the region of the edges of the deep bed filter layer 11, no short circuit path forms for the feed liquid to be filtered and this passes through a shorter path in the deep bed filter layer 11 than the height of the deep bed filter layer 13, the spacer layers 8 have a sealing compound width 12 which corresponds to the height 13 of the deep bed filter layer 11.

LIST OF REFERENCE SYMBOLS

1 Filter module
2 Connection means
3 End cap
3' Open end cap
4 Filter cells
5 Channel
6 Openings in the filter cells
7 Opening in the spacer layers
8 Draining spacer layer for filtrate
8' Draining spacer layer for feed liquid
9 Openings in the end cap 3'
10 Sealing compound
10' Sealing compound for spacer layers 8
11 Deep bed filter layer
12 Width of the sealing compound
13 Height of the deep bed filter layer
14 Permanently elastic material
15 Woven fabrics, knitted fabrics, meshes, nonwoven webs
16 Deep bed filter layer as composite with a filter membrane layer
17 Circumferential plane of the deep bed filter layer
18 Rim-side connection/seal connection
19 Rim-side connection/seal connection
20 Liquid-impermeable tube
21 Filtrate space
22 Separate particles
23 Filter membrane layer
24 External space for feed liquid/unfiltered material
25 Flow arrow
25' Flow arrow

What is claimed is:

1. A filter module for static filtration of liquids comprising two spaced end caps connected via an elongated connection means, a stack of n filter cells and n+1 draining spacer layers for filtrate which are congruent to said filter cells, said filter cells and draining spacer layers being disposed between said end caps, a channel arranged in the interior of the filter module and formed with openings in communication with the filter cells, draining spacer layers and an opening in one of said end caps, wherein n is ≧1, and wherein each filter cell includes both a draining spacer layer for feed liquid and deep bed filter layers which are arranged in a layered manner thereto, and which draining spacer layer and deep bed filter layers are joined to one another at their inner circumference adjacent said channel in a leakproof manner by a liquid-impermeable sealing compound, and wherein each draining spacer layer for filtrate has a sealing compound at its outer rim.

2. A filter module as in claim 1, wherein the filter cells and the draining spacer layers are annular and have a central opening through which the channel extends.

3. The filter module as in claim 1, wherein the sealing compounds have the same height as the filter cells and the draining spacer layers for filtrate.

4. The filter module as in claim 1, wherein the sealing compounds extend over a width in the planes of the draining spacer layers for filtrate, which width corresponds to at least the height of the adjacent filter layer.

5. The filter module as in claim 1, wherein the sealing compounds consist of a permanently elastic material.

6. The filter module as in claim 5, wherein the permanently elastic material is a silicone plastic.

7. The filter module as in claim 5, wherein the permanently elastic material is a polyurethane plastic.

8. The filter module as in claim 1, wherein the spacer layers consist of fibers or wires.

9. The filter module as in claim 8, wherein the spacer layers are woven fabrics, knitted fabrics, meshes or non-woven webs.

10. The filter module as in claim 1, wherein the deep bed filter layers consist of fibrous deep bed filter material.

11. The filter module as in claim 10, wherein deep bed filter layers having differing degrees of separation are arranged for step filtrations.

12. The filter module as in claim 10, wherein the deep bed filter layers have chromatographic properties.

13. The filter module as in claim 10, wherein the deep bed filter materials comprise separate particles.

14. The filter module as in claim 13, wherein the deep bed filter layers have a separation gradient owing to changing fiber diameters and/or packing densities of the fibers.

15. The filter module as in claim 1, wherein the deep bed filter layers are constructed as a composite together with a filter membrane layer.

16. The filter module as in claim 15, wherein the filter membrane layer is joined, at least at the circumferential plane of the deep bed filter layer, to the deep bed filter layer which is adjacent to the filtrate space in a fluid-tight manner at the rim.

17. The filter module as in claim 16, wherein the connection between filter membrane layer and deep bed filter layer consists of a seal connection.

18. The filter module as in claim 15, wherein the filter membrane layer is a membrane adsorber layer.

19. The filter module as in claim 1, wherein the elongated connection means connecting the end caps consists of a liquid-permeable tube which passes through the channel.

20. The filter module as in claim 1, wherein the elongated connection means for connecting the end caps have at least one connecting rod.

21. The filter module as in claim 20, wherein the end caps are larger than the filter cells and draining spacer layers.

22. The filter module as in claim 1, wherein the filter cells are constructed so as to be planar.

23. The filter module as in claim 1, further including a housing having at least one inlet for feed liquid to be filtered and at least one outlet for filtrate, and wherein said filter module is disposed within said housing.

* * * * *